(12) United States Patent
Sakakura et al.

(10) Patent No.: US 10,823,291 B2
(45) Date of Patent: Nov. 3, 2020

(54) MECHANICAL SEAL

(71) Applicant: NIPPON PILLAR PACKING CO., LTD., Osaka (JP)

(72) Inventors: Hiroyuki Sakakura, Osaka (JP); Kenshi Fujita, Osaka (JP)

(73) Assignee: NIPPON PILLAR PACKING CO., LTD., Osaka (JP)

( * ) Notice: Subject to any disclaimer, the term of this patent is extended or adjusted under 35 U.S.C. 154(b) by 23 days.

(21) Appl. No.: 16/060,235

(22) PCT Filed: Apr. 20, 2017

(86) PCT No.: PCT/JP2017/015857
§ 371 (c)(1),
(2) Date: Jun. 7, 2018

(87) PCT Pub. No.: WO2018/047403
PCT Pub. Date: Mar. 15, 2018

(65) Prior Publication Data
US 2018/0363782 A1 Dec. 20, 2018

(30) Foreign Application Priority Data

Sep. 8, 2016 (JP) .................. 2016-175537

(51) Int. Cl.
*F16J 15/34* (2006.01)
*F16J 15/26* (2006.01)

(52) U.S. Cl.
CPC ........... *F16J 15/3496* (2013.01); *F16J 15/26* (2013.01); *F16J 15/3464* (2013.01)

(58) Field of Classification Search
CPC ............................. F16J 15/34; F16J 15/3496
See application file for complete search history.

(56) References Cited

U.S. PATENT DOCUMENTS 9,388,905 B2 7/2016 Takahashi
2003/0064225 A1* 4/2003 Ohashi .................. C23C 16/27
428/408

(Continued)

FOREIGN PATENT DOCUMENTS

CN 2202227 Y 6/1995
CN 101663495 A 3/2010

(Continued)

OTHER PUBLICATIONS

International Search Report dated Aug. 1, 2017 issued in corresponding PCT/JP2017/015857 application (2 pages).

(Continued)

*Primary Examiner* — Gilbert Y Lee
(74) *Attorney, Agent, or Firm* — Millen, White, Zelano & Branigan, P.C.; William Nixon

(57) ABSTRACT

A mechanical seal includes a rotating ring on a rotary shaft, a stationary ring facing the rotating ring in an axial direction, and an elastic means configured to press the rotating ring or the stationary ring toward each other to contact opposed sealing surfaces of the rotating ring and the stationary ring. The mechanical seal partitions a first space and a second space. The first space and the second space are located in the axial direction with the sealing surface interposed therebetween. The stationary ring is made of a sintered compact of SiC. A diamond film is formed on a sealing surface of the stationary ring facing the rotating ring. A diamond film continuous with the diamond film of the sealing surface is formed on an outer circumferential surface or an inner circumferential surface of the stationary ring. Volume resistivity of the stationary ring is $10^1$ to $10^4$ $\Omega\cdot$cm.

7 Claims, 5 Drawing Sheets

(56) References Cited

U.S. PATENT DOCUMENTS

| | | | |
|---|---|---|---|
| 2008/0003099 A1* | 1/2008 | Giesler | F01D 25/22 |
| | | | 415/170.1 |
| 2010/0061676 A1 | 3/2010 | Sugiyama et al. | |
| 2013/0168928 A1* | 7/2013 | Schrufer | C10M 103/02 |
| | | | 277/500 |
| 2016/0053895 A1 | 2/2016 | Otschik et al. | |
| 2016/0056455 A1* | 2/2016 | Shibusawa | C23C 16/26 |
| | | | 429/231.8 |
| 2018/0023559 A1* | 1/2018 | Sato | F04B 39/00 |
| | | | 277/359 |

FOREIGN PATENT DOCUMENTS

| | | |
|---|---|---|
| CN | 105090515 | 11/2015 |
| JP | 2956862 B2 | 7/1999 |
| JP | 2012-97827 A | 5/2012 |
| JP | 5557752 B2 | 6/2014 |
| JP | 2016-516954 A | 6/2016 |

OTHER PUBLICATIONS

English Machine Translation of JP 2956862 B2 published Jul. 23, 1999.
English Machine Translation of JP 2012-097827 A published May 24, 2012.
Office Action dated Dec. 12, 2019, issued in corresponding CN application No. 201780029925.0 (pp. 1-4).
Office Action dated Aug. 2020 issued in corresponding CN application No. 201780029925.0 (pp. 1-7) and English machine translation (pp. 1-7).

* cited by examiner

US 10,823,291 B2

MECHANICAL SEAL

TECHNICAL FIELD

The present invention relates to a mechanical seal. More specifically, it relates to a mechanical seal for sealing between a rotary shaft and a casing in a shaft sealed device, such as, e.g., various industrial pumps and stirring devices, by bringing a sealing surface of a rotating ring and a sealing surface of a stationary ring into contact with each other.

BACKGROUND ART

In a device for processing a strong acid or strong alkaline highly corrosive substance, for example, a stirring device for performing stirring processing of the substance, a container (pressure container) in which a glass or polytetrafluoroethylene which is a fluorine resin is coated on a surface of a base material of metal such as stainless steel is used to secure corrosion resistance. A container coated with a glass is also called a glass-lined kettle (hereinafter also referred to as "GL kettle"), and a container coated with a fluororesin is also called "fluororesin coated kettle" (hereinafter also referred to as "PTFE kettle").

In a stirring device equipped with the GL kettle or the PTFE kettle, the inner side surface of the GL kettle or the PTFE kettle that comes into contact with a highly corrosive substance and the surface of the rotary shaft inserted in the GL kettle or the PTFE kettle to rotate the stirring portion such as a stirring blade for stirring the substance are coated with a glass or a fluorine resin.

By the way, in the case of processing powder or a solvent having low electric conductivity using a stirring device equipped with the GL kettle or the PTFE kettle, static electricity is likely to be generated. In the GL kettle or the PTFE kettle, since a glass or a fluorine resin is coated on its inner side surface as described above, the volume resistivity (also called resistivity) ($\Omega \cdot cm$) is high and the generated static electricity is easily charged. If a large amount of static electricity is charged, there is a possibility that problems, such as, e.g., a dust explosion and ignition on the solvent, occur.

For this reason, the GL kettle, the PTFE kettle, and the rotary shaft are usually grounded so that the static electricity charged on the GL kettle, etc., is eliminated.

SUMMARY OF THE INVENTION

Problems to be Solved by the Invention

In a stirring device equipped with the aforementioned GL kettle or PTFE kettle, static electricity is also charged on the rotating ring and the stationary ring constituting the seal portion of the mechanical seal in addition to the inner side surface of the GL kettle, etc. In such a rotating ring and a stationary ring, not only charging of static electricity from powder or a solvent in the GL kettle or the PTFE kettle but also charging of static electricity generated due to the sliding contact between the sealing surface of the rotating ring and the sealing surface of the stationary ring occur. Of the rotating ring and the stationary ring, the stationary ring is often attached to a seal case via an O-ring. In this case, the stationary ring does not substantially come in contact with the seal case, and is held in a state slightly apart (for example, about 0.15 to 0.30 mm) from the seal case via the O-ring. For this reason, the stationary ring has no portion for leaking static electricity and is structured to be easily charged.

Further, a sintered compact of SiC (silicon carbide) is sometimes used as the material of the stationary ring to ensure high corrosion resistance, but the volume resistivity of SiC ranges from $10^5$ to $10^7$ $\Omega \cdot cm$. Regarding the volume resistivity, it is considered that electricity becomes difficult to flow when the volume resistivity becomes larger than $10^6$ $\Omega \cdot cm$ as a reference, while electricity becomes easy to flow when the volume resistivity is smaller than the reference. In the case of SiC, there are variations in the volume resistivity as described above, which may result in a stationary ring in which electricity hardly flows and static electricity is easily charged. In this case, since the static electricity charged on the stationary ring cannot be discharged as described above, due to the static electricity charged to a large extent, there is a fear that problems, such as, e.g., a dust explosion described above, may occur.

The present invention has been made in view of the aforementioned circumstances, and aims to provide a mechanical seal capable of suppressing static electricity from being charged on a stationary ring.

Means for Solving the Problems (1) The mechanical seal of the present invention includes a rotating ring provided on a rotary shaft to be inserted in a casing, a stationary ring arranged so as to face the rotating ring in an axial direction, and an elastic means configured to urge one of the rotating ring and the stationary ring toward the other thereof to bring opposed sealing surfaces of the rotating ring and the stationary ring into contact with each other, wherein the mechanical seal is configured to partition a first space and a second space, the first space and the second space being located on one side and the other side in the axial direction, respectively, with the sealing surfaces interposed therebetween, the stationary ring is made of a sintered compact of SiC, a diamond film is formed on a sealing surface of the stationary ring facing the rotating ring, a diamond film continuous with the diamond film of the sealing surface is formed on an outer circumferential surface or an inner circumferential surface of the stationary ring, and volume resistivity of the stationary ring on which the diamond film is formed is $10^1$ to $10^4$ $\Omega \cdot cm$.

In the mechanical seal of the present invention, a diamond film is formed on the sealing surface of the stationary ring facing the rotating ring, and a diamond film continuous with the diamond film of the sealing surface is formed on an outer circumferential surface or an inner circumferential surface of the stationary ring. Further, volume resistivity of the stationary ring on which the diamond film is formed is $10^1$ to $10^4$ $\Omega \cdot cm$. Diamond is small in volume resistivity and the volume resistivity of the stationary ring on which such a diamond film is formed varies depending on the film thickness of the diamond film, but when it is within a range of a normal film thickness (for example, 1.0 to 30.0 μm), the volume resistivity is as small as $10^1$ to $10^4$ $\Omega \cdot cm$ as described above. For this reason, the stationary ring allows an easy flow of electricity and therefore can suppress static electricity from being charged thereon.

(2) In the mechanical seal described in the aforementioned Item (1), it is preferable that a diamond film continuous with the diamond film formed on the outer circumferential surface or the inner circumferential surface of the stationary ring be formed on a rear surface of the stationary ring which is a surface opposite to the sealing surface. In this case, it is possible to further reduce the volume resistivity of the stationary to thereby more effectively suppress static electricity from being charged on the stationary ring.

(3) In the mechanical seal described in the aforementioned Item (1) or (2), it is preferable to provide a static electricity elimination portion for eliminating static electricity charged on the stationary ring from the outer circumferential surface and/or the inner circumferential surface of the stationary ring. In this case, since the static electricity charged on the stationary ring can be eliminated by the static electricity elimination portion, it is possible to more effectively suppress the static electricity from being charged on the stationary ring.

(4) In the mechanical seal as described in the aforementioned Item (3), the static electricity elimination portion may be configured to include a supply passage formed in a member to which the stationary ring is attached and configured to supply a cooling water to the outer circumferential surface and/or the inner circumferential surface of the stationary ring, a discharge passage formed in the member and configured to discharge the cooling water supplied to the outer circumferential surface and/or the inner circumferential surface, and a pump configured to supply the cooling water to the supply passage. In this case, by supplying a cooling water to the supply passage by the pump, the stationary ring can be cooled and the static electricity charged on the stationary ring can be discharged to the outside via the cooling water.

(5) In the mechanical seal as recited in any one of the aforementioned Items (1) to (4), an inner surface of the casing and a surface of the rotary shaft which come into contact with an object to be treated in the casing may be coated with a glass or a fluorine resin. In this case, even if static electricity generated when subjecting strong acid or strong alkaline powder or low electric conductivity solvent to stirring processing in the casing is about to take charge on the stationary ring, since the stationary ring is coated with a diamond film and the volume resistivity is small, the static electricity can be suppressed from being charged on the stationary ring.

(6) In the mechanical seal described in the aforementioned Item (5), the object to be treated may be strong acid or strong alkaline powder or low solvent electric conductivity solvent.

Effects of the Invention

According to the mechanical seal of the present invention, it is possible to suppress static electricity from being charged on the rotating ring.

EMBODIMENTS FOR CARRYING OUT THE INVENTION

Hereinafter, embodiments of a mechanical seal of the present invention will be described in detail with reference to the attached drawings.

Outline of Stirring Device

Figure 1:
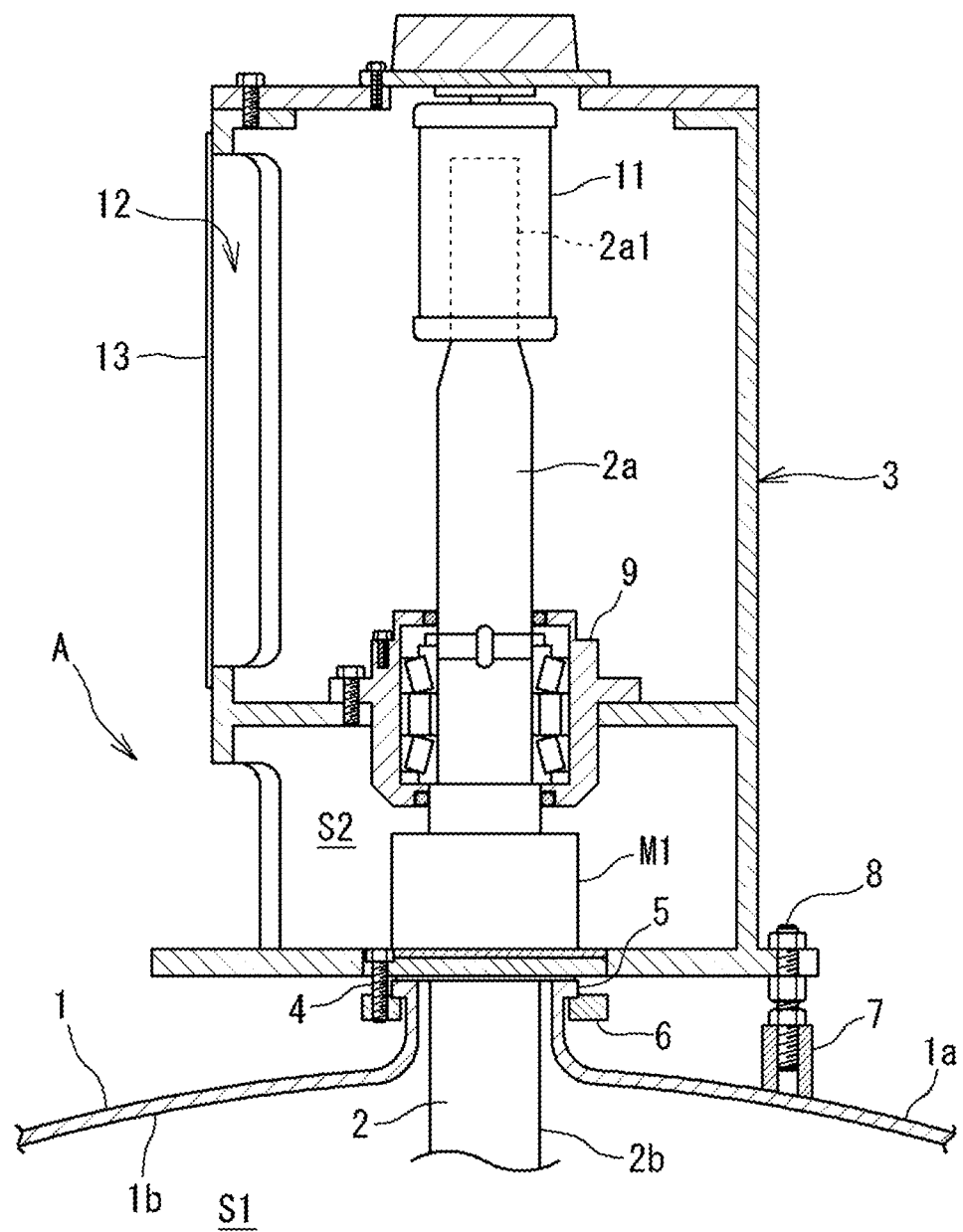
FIG. 1 is a vertical cross-sectional explanatory view of a stirring device which is an example of a device to which a mechanical seal of the present invention is applied.

FIG. 1 is a vertical cross-sectional explanatory view of a stirring device A which is an example of a device to which a mechanical seal of the present invention is applied.

The stirring device A shown in FIG. 1 is a vertical type stirring device in which a shaft or a rotary shaft 2 of a stirring blade (not shown) for stirring an object to be treated in a container 1 is arranged substantially vertically. On the upper end portion (the upper end portion in FIG. 1) of the container 1, a mounting stand 3 is arranged. The mounting stand 3 is attached to a mouth portion 5 of the container 1 with screwing bolts 4 screwed in threaded portions of split flanges 6 arranged under the mouth portion 5 of the container 1. The mounting stand 3 is fixed to a fixing portion 7 formed on the upper end face 1*a* of the container 1 with a stud bolt 8.

A shaft head portion 2*a* of the rotary shaft 2 is arranged in the mounting stand 3, and a bearing 9 and a mechanical seal M1 are provided on the outer circumference of the shaft head portion 2*a*. The tip end 2*a*1 of the shaft head portion 2*a* is inserted in a split coupling 11. The mechanical seal M1 is configured to partition the space S1 in the container 1 (hereinafter also referred to as a first space S1) positioned on one side in the axial direction and the space S2 (hereinafter also referred to as a second space S2) on the other side in the axial direction, and prevent an object to be treated, etc., existing in the container 1 from being leaked to the outside of the device. The opening 12 on the upper lateral side of the mounting stand 3 is closed by a safety cover 13 made of metal, such as, e.g., stainless steel.

The container 1 of the stirring device A is a container which is a so-called GL kettle, and parts and surfaces with which the object to be treated come into contact, such as, e.g., the inner surface 1*b* of the container 1 and the surface 2*b* of the rotary shaft 2, are coated with a glass, such as, e.g., enamel. Since coating with a glass enhances the corrosion resistance, stirring processing of strong acid or strong alkaline highly corrosive substances can be performed in the container 1. By coating polytetrafluoroethylene which is a fluorine resin (hereinafter may also be abbreviated as PTFE), etc., other than glass, the corrosion resistance of the container can be enhanced.

Mechanical Seal

Figure 2:
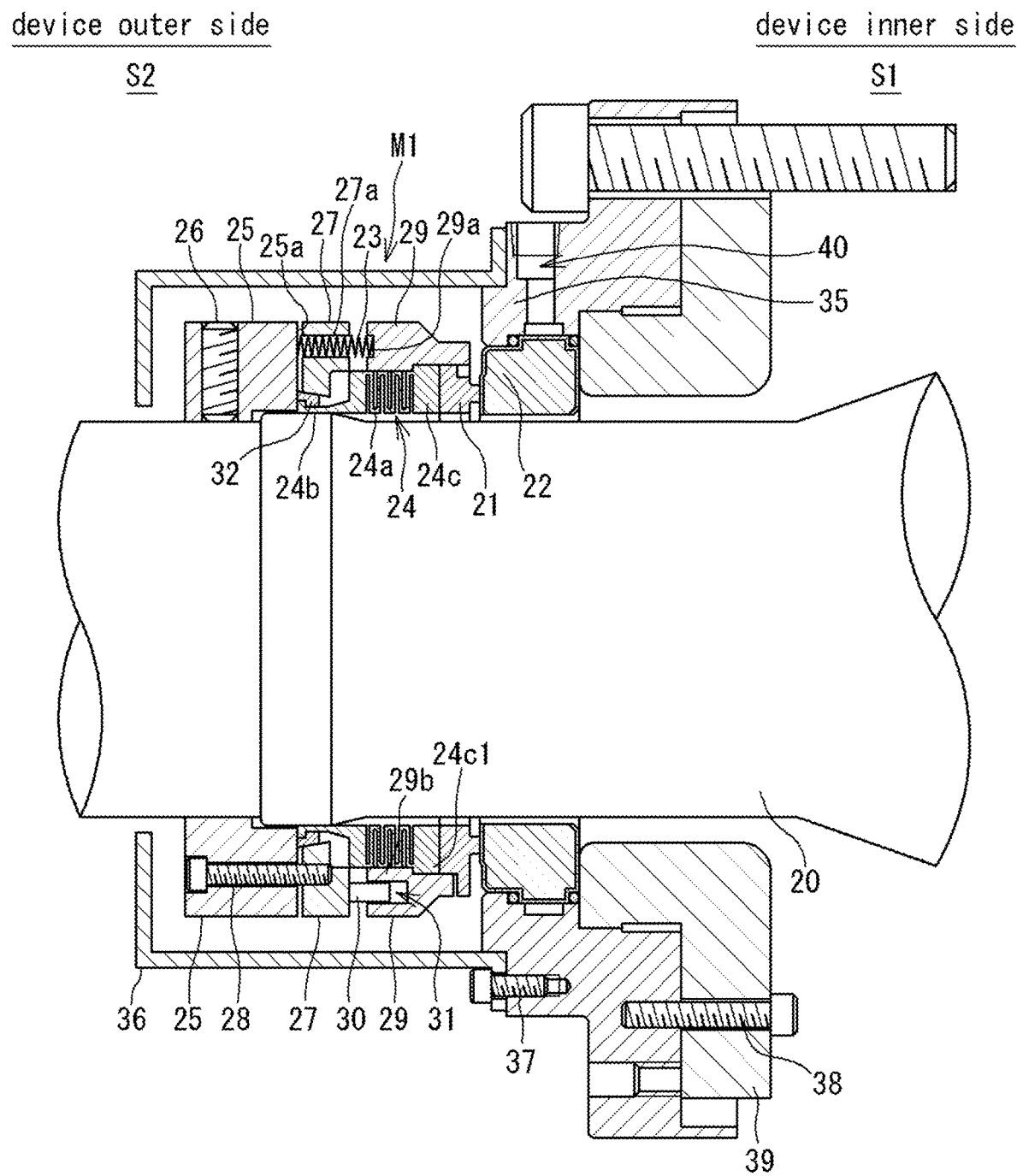
FIG. 2 is a vertical cross-sectional explanatory view of one embodiment of the mechanical seal according to the present invention.
Figure 3:
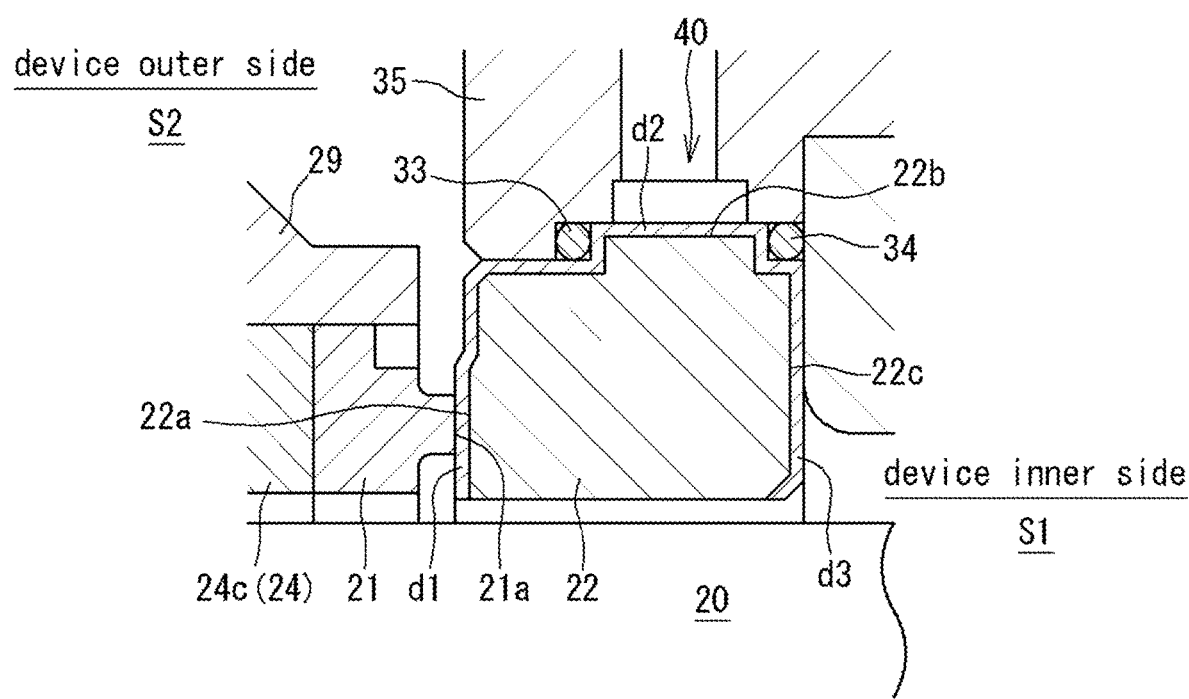
FIG. 3 is an enlarged explanatory view of a main part of the mechanical seal shown in FIG. 2.

FIG. 2 is a vertical cross-sectional explanatory view of the mechanical seal M1 according to one embodiment of the present invention, and FIG. 3 is an enlarged explanatory view of a main part of the mechanical seal M1 shown in FIG. 2. In FIGS. 2 to 3 and FIGS. 4 to 5 to be described later, the film thickness of the diamond film is exaggeratingly depicted for easy understanding. The mechanical seal M1 is attached to the vertical type stirring device, and in FIGS. 2 to 3, the left side is the upper side of the stirring device (device outer side) and the right side is the lower side (device inner side) of the stirring device.

The mechanical seal M1 shown in FIG. 2 is provided with a rotating ring 21 attached to the rotary shaft 20 inserted in the container of the stirring device as a casing, a stationary ring 22 arranged so as to face the rotating ring 21 in the axial direction, a spring 23 and a bellows 24 which are elastic means for urging the rotating ring 21 which is one of the rotating ring 21 and the stationary ring 22 toward the other stationary ring 22 side so as to bring the opposed sealing surfaces of the rotating ring 21 and the stationary ring 22 into contact with each other.

A cylindrical stopper ring 25 is externally fitted to the outer circumference of the rotary shaft 20, and this stopper ring 25 is fixed to the rotary shaft 20 by a set screw 26. An annular drive collar 27 is disposed on the device inner side of the stopper ring 25 in the axial direction. This drive collar 27 is screwed by a bolt 28 penetrating the stopper ring 25 and positioned in the axial direction.

A plurality of springs 23 is mounted at equal intervals in the circumferential direction between the stopper ring 25 and the spring retainer 29. Note that FIG. 2 shows only one spring 23. The spring 23 is arranged in a hole 27a formed in the peripheral portion of the drive collar 27. The device outer side end portion of the spring is in contact with the device inner side surface 25a of the stopper ring 25, and the device inner side end portion of the spring is in contact with the bottom surface of a recessed portion 29a formed on the device outer side surface of the spring retainer 29. The spring 23 urges the spring retainer 29 and the bellows 24 toward the device inner side in the axial direction in order to push the rotating ring 21 toward the stationary ring 22 side to thereby bring the sealing surface 21a (see FIG. 3) of the rotating ring 21 into contact with the sealing surface 22a of the stationary ring 22.

On the device inner side surface of the drive collar 27, an appropriate number of drive pins 30 are formed. While, on the device outer side surface of the spring retainer 29, the same number of recesses 31 as that of the drive pins 30 are formed. By engaging the drive pin 30 with the recess 31, the spring retainer 29 is prevented from being relatively rotated with respect to the drive collar 27 while allowing the movement of the rotating ring 21 in the axial direction within a predetermined range.

The bellows 24 is arranged on the inner circumference side of the spring retainer 29. The bellows 24 is a cylindrical integral structure made of polytetrafluoroethylene or the like which is a fluorine resin excellent in corrosion resistance. The bellows 24 has an expansion and contraction portion 24a of a serpentine cross-sectional shape which is extendable and retractable in the axial direction or in the vertical direction at an intermediate portion in its axial direction or in the vertical direction (left-right direction in FIG. 2). The fixing portion 24b, which is the upper end portion (base end portion) of the bellows 24, is fixedly fitted to the rotary shaft 20 by an annular adapter 32 made of metal such as stainless steel.

The rotating ring 21 is an annular member made of PTFE, etc., containing a filler, such as, e.g., a glass fiber, a carbon fiber, a heat-resistant resin, and graphite, and is provided with a sealing surface 21a which is a smooth annular flat surface orthogonal to the axis line at the lower end portion thereof. The relative rotation between the rotating ring 21 and the spring retainer 29 is prevented.

The rotating ring 21 is integrally connected to a connecting portion 24c which is a lower end portion (tip end portion) of the bellows 24. That is, the rotating ring 21 and the connecting portion 24c of the bellows are connected at the time of the forming processing of the bellows 24 and the rotating ring 21 or either one of them, or by integrating the bellows 24 and the rotating ring 21 after the forming processing thereof. In the integrated state, the boundary between the bellows 24 and the rotating ring 21 in the axial direction does not appear clearly. The outer diameter of the connecting portion 24c of the bellows 24 is slightly larger than the expansion and contraction portion 24a and the fixing portion 24b of the bellows 24 so as to have the same outer diameter as that of the upper end portion (base end portion) of the rotating ring 21.

An annular step portion 29b is formed on the inner circumferential side of the spring retainer 29. The peripheral portion of the connecting portion 24c of the bellows 24 is defined as a step portion 24c1 which protrudes radially outward than the outer circumferential surface of the expansion and contraction portion 24a of the bellows 24. The step portion 29b of the spring retainer 29 is engaged with the step portion 24c1 of the expansion and contraction portion 24a of the bellows 24, and it is configured such that both the step portions 29b and 24c1 are engaged so that the urging force of the spring 23 acts on the bellows 24 via the spring retainer 29.

The stationary ring 22 is made of a sintered compact of SiC (silicon carbide), and this sintered compact can be obtained, for example, by room temperature sintering or reaction sintering of SiC. The stationary ring 22 is attached to the first flange 35 via O-rings 33 and 34. To this first flange 35, a cover 36 made of a synthetic resin, such as, e.g., an acrylic resin, for preventing scattering of abrasion powder generated from the rotating ring 21 and/or the stationary ring 22 is fixed by bolts 37. Further, to the first flange 35, a second flange 39 is attached by bolts 38. In this embodiment, the first flange 35 is provided with a supply hole 40 which is a supply passage for supplying a cooling liquid to the outer circumferential surface of the stationary ring 22. In the stationary ring 22, a discharge hole (not shown) which is a discharge passage for discharging the cooling liquid supplied to the stationary ring 22 to the outside is formed at a position opposite to the supply hole 40 with respect to the rotary shaft 20. The cooling liquid is supplied to the supply hole 40 by a pump (not shown). In this embodiment, the supply hole 40, the discharge hole, and the pump constitute a static electricity elimination portion for eliminating the static electricity charged on the stationary ring 22.

At the device outer side end portion of the stationary ring 22 in the axial direction, a sealing surface 22a which is a smooth annular plane orthogonal to the axis is formed. The sealing surface 21a of the rotating ring 21 is in contact with the sealing surface 22a of the stationary ring 22 in an urged manner, so that the first space S1 on the device inner side and the second space S2 on the device outer side are sealed.

In this embodiment, diamond films d1, d2, and d3 are, respectively, formed on the sealing surface 22a of the stationary ring 22, the outer circumferential surface 22b of the stationary ring 22, and the rear surface 22c of the stationary ring 22 which is a surface opposite to the sealing surface 22a. The diamond films d1, d2, and d3 are formed so as to be continuous with each other. The volume resistivity of the stationary ring 22 made of a sintered compact of SiC forming each diamond film d1, d2, and d3 varies to some extent depending on the film thickness of the diamond film d1, d2, and d3, but is a small value of $10^1$ to $10^4$ Ω·cm. For this reason, electricity flows easily through the stationary ring 22, which can suppress static electricity from being charged on the stationary ring 22. That is, even if charging of static electricity occurs from the powder and/or the solvent in the container of the stirring device provided with the mechanical seal M1, or even if charging of static electricity occurs due to the sliding contact between the sealing surface 21a of the rotating ring 21 and the sealing surface 22a of the stationary ring 22, since the stationary ring 22 is small in volume resistivity and electricity easily flows therethrough, the static electricity is suppressed from being charged on the stationary ring 22.

Further, in this embodiment, the supply hole 40 for supplying a cooling liquid is formed in the first flange 35 which is a member to which the stationary ring 22 is attached. Therefore, by supplying a cooling water from the supply hole 40 to the outer circumferential surface 22b of the stationary ring 22, not only the stationary ring 22 can be cooled but also static electricity charged on the stationary ring 22 can be discharged to the outside of the device via the cooling water. Therefore, it is possible to more effectively suppress static electricity from being charged on the stationary ring 22.

Each diamond film d1, d2, and d3 can be produced by using general manufacturing techniques, such as, e.g., a microwave CVD method and a hot filament CVD method. The thickness of the diamond film d1, d2, and d3 is not particularly limited in the present invention, but is usually 1.0 to 30.0 µm, preferably 5.0 to 15.0 µm. From the viewpoint of further reducing the volume resistivity of the stationary ring 22, it is desirable that the thickness be 5.0 µm or more. As the diamond film d1, d2, and d3 becomes thicker, the surface roughness of the film also increases, making it difficult to use as the sealing surface of the mechanical seal M1 which is a precision mechanical part, and also the residual stress of the diamond film d1, d2, and d3 increases. In consideration of the above, it is desirable that the diamond film be 15.0 µm or less. The diamond film d1 and the diamond films d2 and d3 may have the same thickness, but they may have different thicknesses.

When doping an impurity, such as, e.g., boron, into the film at the time of forming the diamond film, the volume resistivity of the stationary ring 22 can be made smaller than in the case of forming a film consisting only of diamond. Further, by increasing the doping amount, the volume resistivity can be reduced. On the other hand, when doping the diamond film with boron, etc., the brittleness of the formed film deteriorates (the film becomes fragile). Therefore, in the mechanical seal M1 which seals the rotating ring 21 and the stationary ring 22 by sliding contact, it is preferable to form the diamond film (non-doped diamond film) not doped with boron, etc., in the stationary ring 22.

Figure 4:
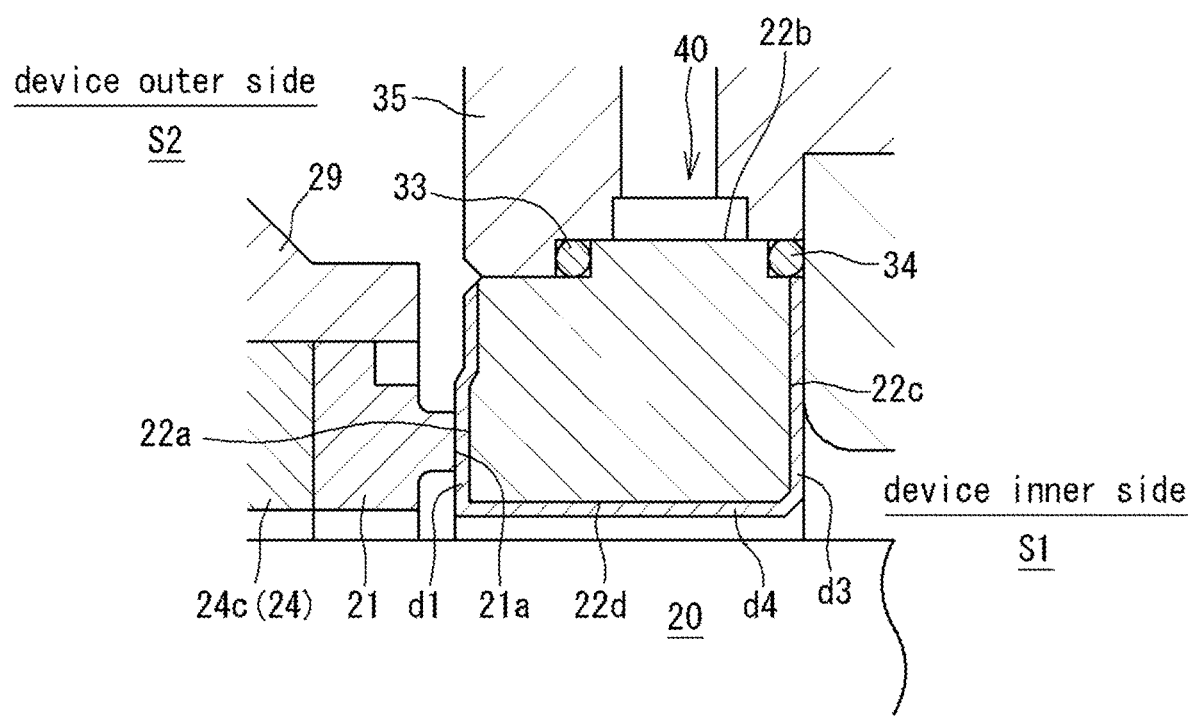
FIG. 4 is an enlarged explanatory view of a main part of a modification of the mechanical seal shown in FIG. 2.

FIG. 4 is an enlarged explanatory view illustrating a main part of a modification of the embodiment shown in FIGS. 2 to 3. This modification is different from the mechanical seal M1 according to the aforementioned embodiment in that a diamond film d4 is formed on the inner circumferential surface 22d of the stationary ring 22 in place of the outer circumferential surface 22b of the stationary ring 22. Therefore, the same reference numeral is allotted to the constituent element common to the aforementioned embodiment, and the explanation thereof will be omitted for simplicity.

In this modification, diamond films d1, d4, and d3 are formed on the sealing surface 22a of the stationary ring 22, the inner circumferential surface 22d of the stationary ring 22, and the rear surface 22c of the stationary ring 22 which is a surface opposite to the sealing surface 22a, respectively. The diamond films d1, d4, and d3 are formed so as to be continuous with each other. Therefore, also in this embodiment, electricity flows easily through the stationary ring 22, which can suppress static electricity from being charged on the stationary ring 22. That is, even if charging of static electricity occurs from the powder and/or the solvent in the container of the stirring device provided with the mechanical seal M1, or even if charging of static electricity occurs due to the sliding contact between the sealing surface 21a of the rotating ring 21 and the sealing surface 22a of the stationary ring 22, since the stationary ring 22 on which the diamond films d1, d4 and d3 are formed is small in volume resistivity and allows easy flow of electricity, static electricity is suppressed from being charged on the stationary ring 22.

In order to clarify the difference from the aforementioned embodiment, the diamond films d1, d4, and d3 are formed on the sealing surface 22a, the inner circumferential surface 22d, and the rear surface 22c of the stationary ring 22, respectively. However, in addition, a diamond film d2 may be formed on the outer circumferential surface 22b.

Figure 5:
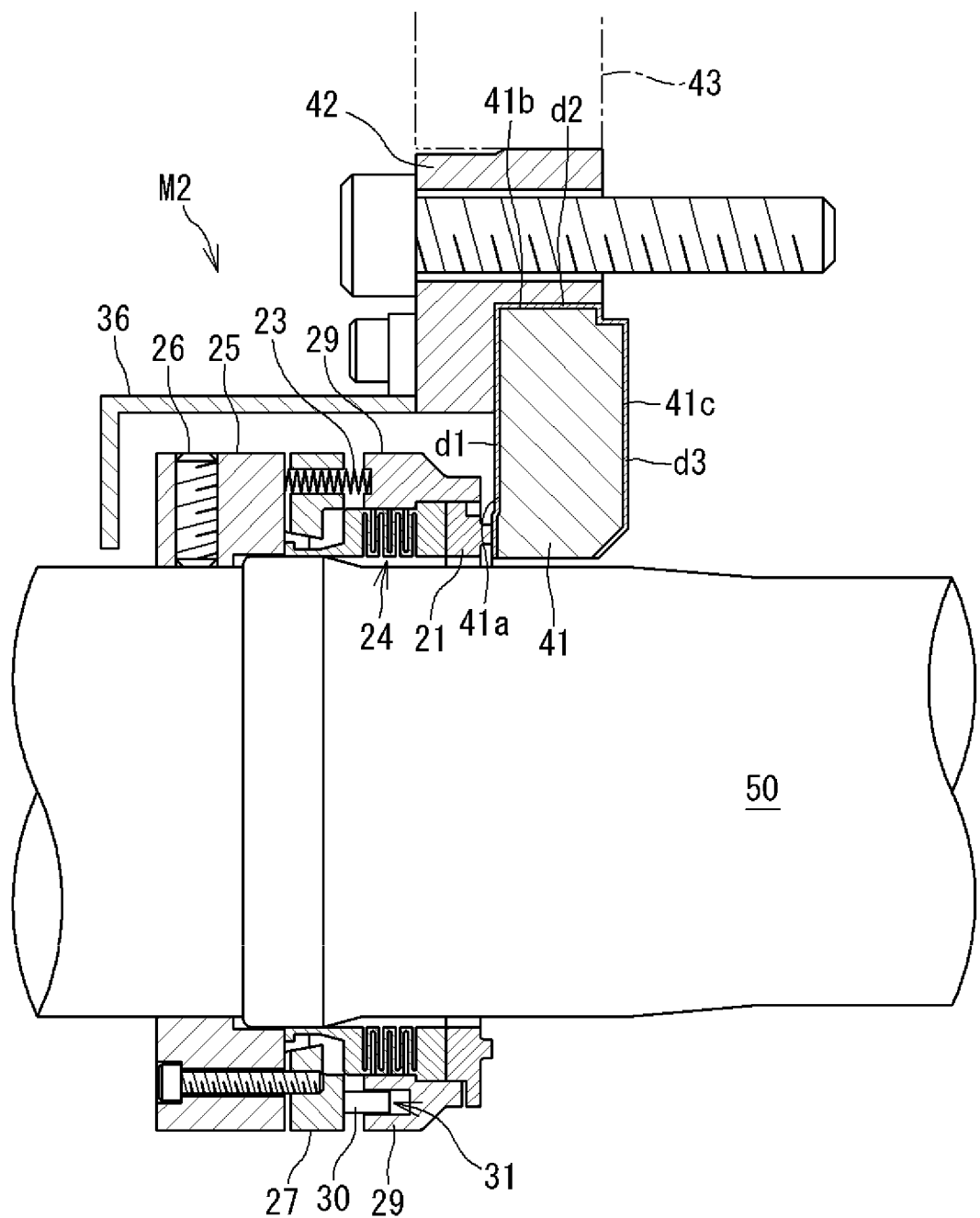
FIG. 5 is an enlarged explanatory view of a main part of another embodiment of a mechanical seal according to the present invention.

FIG. 5 is a vertical cross-sectional explanatory view of a mechanical seal M2 according to another embodiment of the present invention. The basic structure of the mechanical seal M2 is common to the mechanical seal M1 except that the configurations of the rotary shaft 50 and the stationary ring 41 and the configuration of the first flange 42 to which the stationary ring 41 is attached are different from the configurations of the rotary shaft 20 and the stationary ring 22 and the configuration of the first flange 35 in the mechanical seal M1 according to the embodiment shown in FIGS. 2 to 4. Therefore, the same reference symbol is allotted to the element and member common to the two mechanical seals M1 and M2, and the explanation thereof will be omitted for simplicity.

In this embodiment, diamond films d1, d2, and d3 are formed on the sealing surface 41a, the outer circumferential surface 41b, and the rear surface 41c of the stationary ring 41 which is a surface of the stationary ring 41 opposite to the sealing surface 41a, respectively. The diamond films d1, d2, and d3 are formed so as to be continuous with each other. For this reason, electricity flows easily through the stationary ring 41, which can suppress static electricity from being charged on the stationary ring 41. That is, even if charging of static electricity occurs from the powder and/or the solvent in the container of the stirring device provided with the mechanical seal M2, or even if charging of static electricity occurs due to the sliding contact between the sealing surface 21a of the rotating ring 21 and the sealing surface 41a of the stationary ring 41, since the stationary ring 41 on which the diamond films d1, d2 and d3 are formed is small in volume resistivity and allows easy flow of electricity, static electricity is suppressed from being charged on the stationary ring 41.

In this embodiment, the stationary ring 41 is directly fitted to the first flange 42 without interposing an O-ring, unlike the stationary ring 22 in the mechanical seal M1. Also, the mounting stand 43 is in contact with the outer circumference of the first flange 42. Both the first flange 42 and the mounting stand 43 are made of metal, such as, e.g., stainless steel and carbon steel, which is energizable. Therefore, the static electricity charged on the stationary ring 41 can be discharged to the outside of the device via the first flange 42 and the mounting stand 43. As a result, charging of the stationary ring 41 can be suppressed more effectively. In this embodiment, the first flange 42 and the mounting stand 43, which are metallic members in electrical contact with the stationary ring 41, constitute a static electricity elimination portion that eliminates the static electricity charged on the stationary ring 41.

OTHER MODIFICATIONS

It should be noted that the mechanical seal of the present invention is not limited to the embodiments described above, and various modifications can be made within the scope recited in claims.

For example, in the embodiment described above, a vertical stirring device is exemplified as a device to which the mechanical seal is applied, but the mechanical seal can be applied to a horizontal stirring device. In addition to the stirring device, the mechanical seal of the present invention can also be applied to a pump with a glass lining, etc., or a stainless steel or carbon steel industrial pump which is charged by a fluid to be used. In either case, by forming a diamond film on the surface of the stationary ring, the volume resistivity of the contacting stationary ring can be reduced, which can suppress static electricity from being charged on the stationary ring.

DESCRIPTION OF REFERENCE SYMBOLS

1: container
1$a$: upper end surface
1$b$: inner side surface
2: rotary shaft
2$a$: shaft head portion
2$b$: surface
3: mounting stand
4: bolt
5: mouth portion
6: split flange
7: fixing portion
8: stud bolt
9: bearing
11: split coupling
12: opening
13: safety cover
20: rotary shaft
21: rotating ring
21$a$: sealing surface
22: stationary ring
22$a$: sealing surface
22$b$: outer circumferential surface
22$c$: rear surface
22$d$: inner circumferential surface
23: spring
24: bellows
24$a$: expansion and contraction portion
24$b$: fixing portion
24$c$: connecting portion
25: stopper ring
26: set screw
27: drive collar
28: bolt
29: spring retainer
29$a$: recessed portion
29$b$: step portion
30: drive pin
31: recess
32: adapter
33: O-ring
34: O-ring
35: first flange
36: cover
37: bolt
38: bolt
39: second flange
40: supply hole
41: stationary ring
42: first flange
43: mounting stand
50: rotary shaft
A: stirring device
M1: mechanical seal
M2: mechanical seal
S1: first space
S2: second space
d1: diamond film
d2: diamond film
d3: diamond film
d4: diamond film

The invention claimed is:

1. A mechanical seal comprising:
a rotating ring provided on a rotary shaft to be inserted in a casing;
a stationary ring arranged so as to face the rotating ring in an axial direction;
an elastic means configured to urge one of the rotating ring and the stationary ring toward the other thereof to bring opposed sealing surfaces of the rotating ring and the stationary ring into contact with each other, wherein
the mechanical seal is configured to partition a first space and a second space, the first space and the second space being located on one side and the other side in the axial direction, respectively, with the sealing surfaces interposed therebetween,
the stationary ring is made of a sintered compact of SiC,
a diamond film is formed on a sealing surface of the stationary ring facing the rotating ring,
a diamond film continuous with the diamond film of the sealing surface is formed on an outer circumferential surface or an inner circumferential surface of the stationary ring, and
volume resistivity of the stationary ring on which the diamond film is formed is $10^1$ to $10^4$ Ω·cm; and
an inner surface of the casing and a surface of the rotary shaft which comes into contact with an object to be treated in the casing is coated with a glass or fluorine resin.

2. The mechanical seal as recited in claim 1, wherein a diamond film continuous with the diamond film formed on the outer circumferential surface or the inner circumferential surface of the stationary ring is formed on a rear surface of the stationary ring which is a surface opposite to the sealing surface.

3. The mechanical seal as recited in claim 1, wherein the object to be treated is strong acid or strong alkaline powder or low solvent electric conductivity solvent.

4. The mechanical seal as recited in claim 1, wherein the elastic means includes a plurality of springs mounted at equal intervals in a circumferential direction.

5. The mechanical seal as recited in claim 1, further comprising a static electricity elimination portion for eliminating static electricity charged on the stationary ring from the outer circumferential surface or the inner circumferential surface of the stationary ring.

6. The mechanical seal as recited in claim 5, wherein the static electricity elimination portion is configured to include a supply passage formed in a member to which the stationary ring is attached and configured to supply a cooling water to the outer circumferential surface and/or the inner circumferential surface of the stationary ring, a discharge passage formed in the member and configured to discharge the cooling water supplied to the outer circumferential surface and/or the inner circumferential surface, and a pump configured to supply the cooling water to the supply passage.

7. A mechanical seal comprising:
a rotating ring provided on a rotary shaft to be inserted in a casing;

a stationary ring arranged so as to face the rotating ring in an axial direction;

an elastic means configured to urge one of the rotating ring and the stationary ring toward the other thereof to bring opposed sealing surfaces of the rotating ring and the stationary ring into contact with each other; and an inner surface of the casing and a surface of the rotary shaft which come into contact with an object to be treated in the casing is coated with a glass or a fluorine resin, wherein the mechanical seal is configured to partition a first space and a second space, the first space and the second space being located on one side and the other side in the axial direction, respectively, with the sealing surfaces interposed therebetween, the stationary ring is made of a sintered compact of SiC, a diamond film is formed on a sealing surface of the stationary ring facing the rotating ring, a diamond film continuous with the diamond film of the sealing surface is formed on an outer circumferential surface or an inner circumferential surface of the stationary ring.

\* \* \* \* \*